United States Patent
You et al.

(10) Patent No.: US 12,119,957 B2
(45) Date of Patent: Oct. 15, 2024

(54) ELECTRONIC DEVICE FOR CONTROLLING EXTERNAL DEVICE BASED ON OCCUPANT MONITORING SYSTEM, AND METHOD THEREOF

(71) Applicant: SAMSUNG ELECTRONICS CO., LTD., Suwon-si (KR)

(72) Inventors: Juyeon You, Suwon-si (KR); Jinah Kong, Suwon-si (KR); Yongjun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/070,286

(22) Filed: Nov. 28, 2022

(65) Prior Publication Data
US 2023/0171123 A1 Jun. 1, 2023

Related U.S. Application Data

(63) Continuation of application No. PCT/KR2022/018281, filed on Nov. 18, 2022.

(30) Foreign Application Priority Data

Nov. 26, 2021 (KR) .......................... 10-2021-0165191
Dec. 6, 2021 (KR) .......................... 10-2021-0172846

(51) Int. Cl.
*H04L 12/28* (2006.01)
*H04L 67/125* (2022.01)
(52) U.S. Cl.
CPC ...... *H04L 12/2818* (2013.01); *H04L 12/2827* (2013.01); *H04L 67/125* (2013.01)
(58) Field of Classification Search
CPC ........................ H04L 12/2818; H04L 12/2827; H04L 67/125
See application file for complete search history.

(56) References Cited

U.S. PATENT DOCUMENTS 8,849,301 B2 * 9/2014 Husney .................. H04W 4/02
700/275
9,466,161 B2 * 10/2016 Ricci ....................... G06F 3/013
(Continued)

FOREIGN PATENT DOCUMENTS

JP 2002-064881 2/2002
JP 2002-101474 4/2002
(Continued)

OTHER PUBLICATIONS

Search Report dated Dec. 7, 2022 in International Patent Application No. PCT/KR2022/012091.
(Continued)

*Primary Examiner* — George C Neurauter, Jr.
(74) *Attorney, Agent, or Firm* — Nixon & Vanderhye, P.C.

(57) ABSTRACT

An example server may include at least one communication module (e.g., including communication circuitry), and a processor. The processor may be configured to receive movement information and first occupant information related to a vehicle device, using the at least one communication module, select at least one first external device from among a plurality of external devices related to a local network, based on the movement information and the first occupant information, calculate a first display time to display a first confirmation message asking whether to control the at least one first external device, based on an arrival time included in the movement information and at least one first operation time of the at least one first external device, and transmit a first request signal causing display of the first confirmation message on a display of the vehicle device at the first display time, using the at least one communication module.

19 Claims, 11 Drawing Sheets

(56) References Cited

U.S. PATENT DOCUMENTS

| | | | |
|---|---|---|---|
| 9,734,412 B2* | 8/2017 | Tan | H04W 4/029 |
| 9,800,995 B2* | 10/2017 | Libin | H04W 4/60 |
| 9,922,549 B2* | 3/2018 | Warren | G08C 17/02 |
| 10,012,964 B2* | 7/2018 | Deilmann | G05B 15/02 |
| 10,275,959 B2* | 4/2019 | Ricci | G08G 1/096725 |
| 10,492,043 B1 | 11/2019 | Kim et al. | |
| 10,893,010 B1* | 1/2021 | Argenti | G08G 1/093 |
| 11,093,767 B1* | 8/2021 | Argenti | B60W 50/14 |
| 2010/0127854 A1* | 5/2010 | Helvick | H04L 12/2818 340/539.14 |
| 2013/0205026 A1* | 8/2013 | Ricci | G06F 3/0484 709/225 |
| 2013/0231784 A1* | 9/2013 | Rovik | G05B 15/02 700/275 |
| 2014/0306833 A1* | 10/2014 | Ricci | G06V 40/28 340/901 |
| 2014/0309789 A1* | 10/2014 | Ricci | G06Q 20/308 700/276 |
| 2014/0309806 A1* | 10/2014 | Ricci | H04W 48/04 701/1 |
| 2014/0309849 A1* | 10/2014 | Ricci | G06Q 30/00 701/33.4 |
| 2014/0309868 A1* | 10/2014 | Ricci | G06Q 10/00 701/36 |
| 2015/0084750 A1* | 3/2015 | Fitzgibbon | G08C 17/02 340/12.29 |
| 2015/0217825 A1* | 8/2015 | Tamura | H04W 4/48 340/905 |
| 2015/0293509 A1* | 10/2015 | Bankowski | H04L 12/2818 700/275 |
| 2016/0021595 A1 | 1/2016 | Czaja et al. | |
| 2016/0039426 A1* | 2/2016 | Ricci | H04L 67/12 701/1 |
| 2016/0196745 A1* | 7/2016 | Ricci | G06F 3/0488 340/905 |
| 2016/0377305 A1* | 12/2016 | Kwa | F24F 11/79 700/277 |
| 2017/0247000 A1* | 8/2017 | Ricci | B60R 16/037 |
| 2020/0406860 A1* | 12/2020 | Mai | B60R 25/31 |
| 2021/0004705 A1 | 1/2021 | Kim | |
| 2021/0174975 A1 | 6/2021 | Shin | |
| 2022/0201083 A1* | 6/2022 | Kathpal | H04W 4/44 |

FOREIGN PATENT DOCUMENTS

| | | |
|---|---|---|
| JP | 2005-210361 | 8/2005 |
| JP | 2009-293996 | 12/2009 |
| JP | 2012-181175 | 9/2012 |
| JP | 2020-159628 | 10/2020 |
| KR | 10-2006-0118056 | 11/2006 |
| KR | 10-2007-0072687 | 7/2007 |
| KR | 10-2017-0078039 | 7/2017 |
| KR | 10-2019-0014884 | 2/2019 |
| KR | 10-2019-0074909 | 6/2019 |
| KR | 10-2020-0006239 | 1/2020 |
| KR | 10-2021-0071614 | 6/2021 |
| KR | 10-2021-0108558 | 9/2021 |
| KR | 10-2592208 | 10/2023 |

OTHER PUBLICATIONS

Written Opinion dated Dec. 7, 2022 in International Patent Application No. PCT/KR2022/012091.

Extended Search Report dated Jun. 17, 2024 in European Patent Application No. 22898953.9.

* cited by examiner

| Data | Active | Tired | Sleeping |
|---|---|---|---|
| Eye Openness Levels | High | Medium | Low |
| Blinks per Minute | 1 to 29 | 30 or more | 0 |
| Mouth Motion-Yawn | – | 5 or more | – |
| Head Position | – | – | Low down |
| Fatigue level determination | Wwo or more items detected | | |

ELECTRONIC DEVICE FOR CONTROLLING EXTERNAL DEVICE BASED ON OCCUPANT MONITORING SYSTEM, AND METHOD THEREOF

CROSS-REFERENCE TO RELATED APPLICATIONS

This application is a continuation of International Application No. PCT/KR2022/018281 designating the United States, filed on Nov. 18, 2022, in the Korean Intellectual Property Receiving Office and claiming priority to Korean Patent Application No. 10-2021-0165191, filed on Nov. 26, 2021, in the Korean Intellectual Property Office, and to Korean Patent Application No. 10-2021-0172846, filed on Dec. 6, 2021, in the Korean Intellectual Property Office, the disclosures of all of which are incorporated by reference herein in their entireties.

BACKGROUND

Field

The disclosure relates to an electronic device for controlling an external device (e.g., an external electronic device) based on an occupant monitoring system, and a method thereof.

Description of Related Art

Based on to the development of wireless communication technology, networks may be formed with various objects equipped with a communication function, and thus these objects may be easily controlled. As such, networking objects including a communication function are referred to as the Internet of things (IoT), which is widely used in real life. The IoT may find applications in various fields such as smart home, smart building, smart city, smart car or connected car, smart grid, healthcare, smart home appliance, or advanced medical service through convergence and merging between the existing information technology (IT) and various industries.

A vehicle may refer, for example, to transportation used for moving people or cargo by kinetic energy. A typical example of a vehicle is a car. For the safety and convenience of users using a vehicle, various vehicle-related devices are mounted on the vehicle, and the functions of the vehicle are diversified. Various types of displays are provided inside the vehicle, and a vehicle device helps to provide various functions to passengers by controlling information output to the displays. The vehicle is provided with various types of sensors (e.g., an image sensor and a temperature sensor), a positioning module (e.g., including positioning circuitry), and a communication module (e.g., including communication circuitry), and the vehicle device may obtain various pieces of vehicle-related information using the sensors, the positioning module, and the communication module.

Location information about the vehicle may be transmitted to a home network to control various external devices registered to the home network.

SUMMARY

By way of example, there may be multiple spaces (e.g., a room, a living room, a kitchen, and a bathroom) at the destination (e.g., a user's home) of the vehicle, and multiple Internet of things (IoT) devices may be deployed in each space. However, simply operating all of various external devices registered to the home network in advance according to the location information about the vehicle may cause unnecessary power consumption. Moreover, after a user arrives at the destination, the user needs to readjust the pre-operated external devices according to the user's situation.

Operations of external devices disposed in an unnecessary space may be minimized by predicting a space to be used after arrival based on information related to an occupant in a vehicle on the way home by providing an electronic device for controlling an external device based on an occupant monitoring system and a method thereof according to various embodiments.

The technical problems to be solved in the disclosure are not limited to what has been described above, and other technical problems which are not described may be clearly understood by those skilled in the art from the following description.

According to various embodiments, a server may include at least one communication module (e.g., including communication circuitry), and a processor. The processor may be configured to receive movement information and first occupant information related to a vehicle device, using the at least one communication module, select at least one first external device from among a plurality of external devices related to a local network, based on the movement information and the first occupant information, calculate a first display time to display a first confirmation message asking whether to control the at least one first external device, based on an arrival time included in the movement information and at least one first operation time of the at least one first external device, and transmit a first request signal causing display of the first confirmation message on a display of the vehicle device at the first display time, using the at least one communication module.

According to various embodiments, a method of operating a server may include receiving movement information and first occupant information related to a vehicle device, using at least one communication module of the server, selecting at least one first external device from among a plurality of external devices related to a local network, based on the movement information and the first occupant information, calculating a first display time to display a first confirmation message asking whether to control the at least one first external device, based on an arrival time included in the movement information and at least one first operation time of the at least one first external device, and transmitting a first request signal causing display of the first confirmation message on a display of the vehicle device at the first display time, using the at least one communication module.

According to various embodiments, an electronic device may include a display module, at least one communication module, and a processor. The processor may be configured to receive, from a server, a first request signal for displaying a first confirmation message for controlling at least one first external device among a plurality of external devices related to a local network of a destination of a vehicle device in which a user of the electronic device is located, using the at least one communication module, display the first confirmation message, using the display module, identify a user consent to the first confirmation message based on a user input, and transmit a confirmation signal to the server, using the at least one communication module in response to the identification of the user consent.

An electronic device for controlling an external device based on an occupant monitoring system and a method thereof according to various embodiments may prevent unnecessary power consumption by predicting a space to be used after arrival based on information related to an occupant in a vehicle on the way home, and thus minimizing operations of external devices arranged in an unnecessary space.

As an electronic device for controlling an external device based on an occupant monitoring system and a method thereof according to various embodiments are provided, a personalized function may be provided to each occupant in a vehicle, and an appropriate external device may be pre-controlled based on a user's schedule or use data for an actual external device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
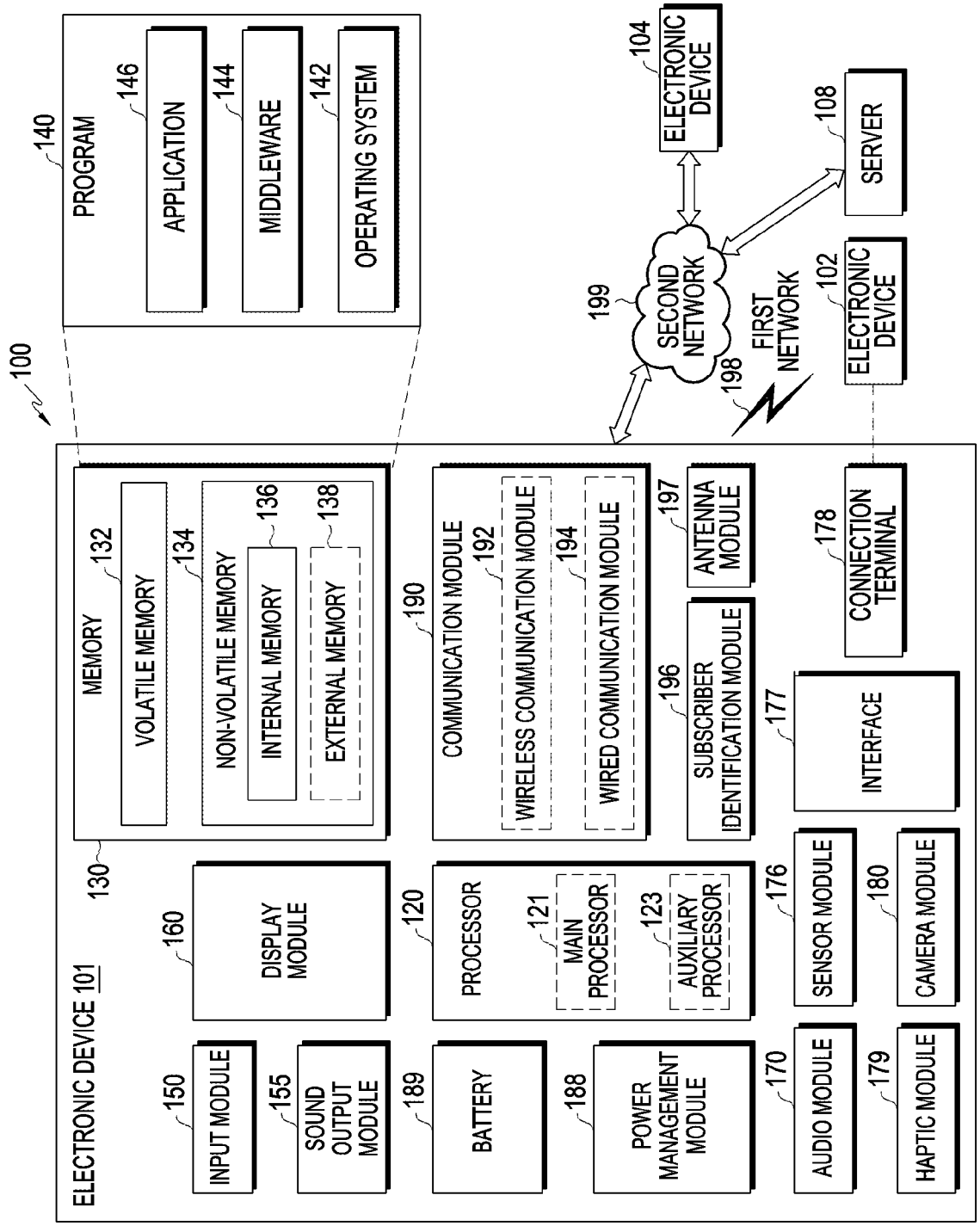
FIG. 1 is a block diagram illustrating an example electronic device in a network environment according to various embodiments.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)). According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
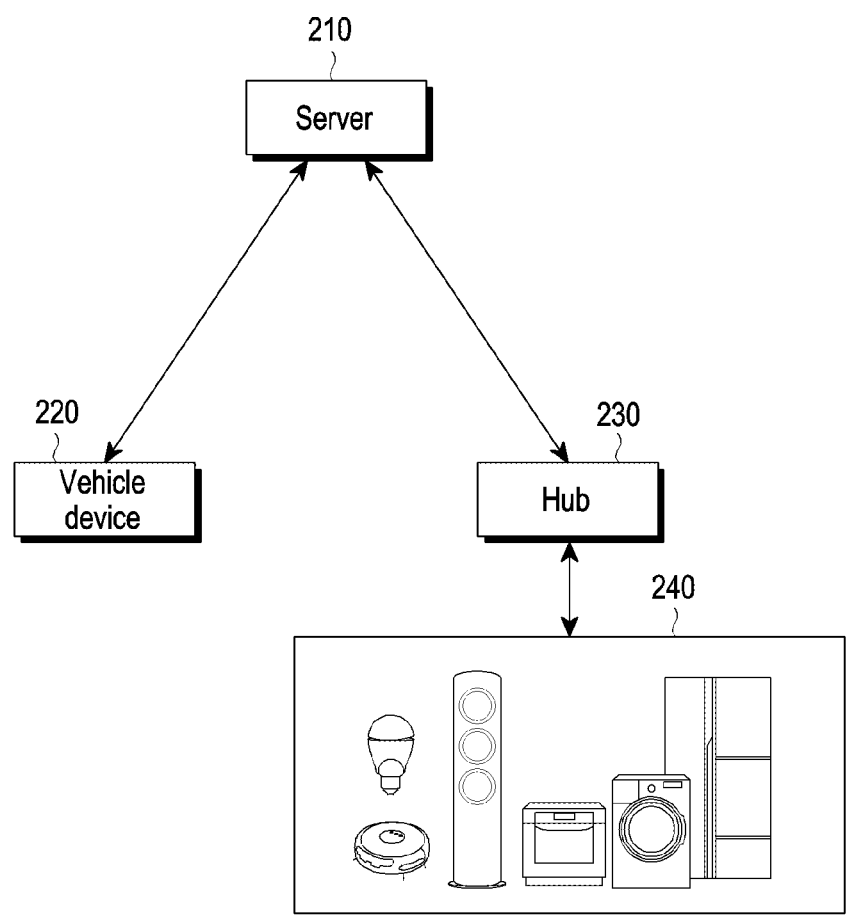
FIG. 2 is a diagram illustrating components of an example network environment according to various embodiments.
Figure 3:
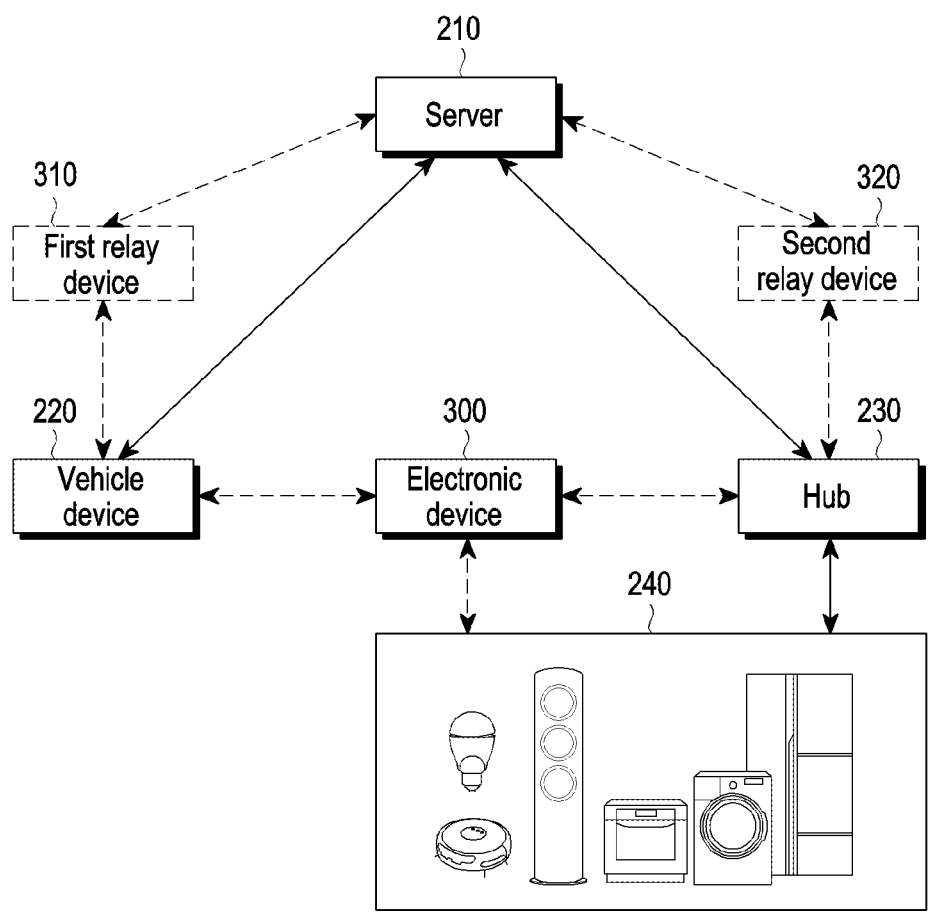
FIG. 3 is a diagram illustrating components of an example network environment according to various embodiments.

FIG. 2 is a diagram illustrating components of an example network environment according to various embodiments. FIG. 3 is a diagram illustrating components of an example network environment according to various embodiments. A network environment according to various embodiments will be described with reference to FIGS. 2 and 3.

Referring to FIG. 2, a network environment according to various embodiments may include a server 210, a vehicle device 220, a hub 230, and a plurality of external devices 240.

Referring to FIG. 3, the network environment according to various embodiments may further include an electronic device 300, a first relay device 310, or a second relay device 320. The electronic device 300 may be the electronic device 101 of FIG. 1.

According to various embodiments, the hub 230 may include a communication module (e.g., including communication circuitry) and receive data from the plurality of external devices 240 through the communication module. The hub 230 may be referred to as a hub device, a control device, an access point, a coordinator, or a server. According to an embodiment, the hub 230 may communicate with the plurality of external devices 240 and the electronic device 300 based on a first communication scheme or a second communication scheme. According to other embodiments, the hub 230 may communicate with the plurality of external devices 240 based on the first communication scheme and communicate with the electronic device 300 based on the second communication scheme. The first communication scheme and the second communication scheme may be identical to or different from each other. When the first communication scheme and the second communication scheme are different, the first communication scheme may consume less power than the second communication scheme. The hub 230 may perform communication with at least some of the plurality of external devices 240 based on a third communication scheme, instead of the first communication scheme. The types of the first communication scheme, the second communication scheme, and the third communication scheme are not limited. For example, the hub 230 may collect data received from the plurality of external devices 240 in a house through communication, and transmit the collected data to the electronic device 300 in the house or the remote server 210. The hub 230 may be formed as a separate device or embedded in an electronic device such as a TV. A network including the hub 230 and the plurality of external devices 240 may be referred to as a "local network" (or a home network). A local network may refer, for example, to a network formed in a house, and those skilled in the art may understand that the space in which the local network is formed is not limited to the house, and the local network may be formed in an office or a building. For example, referring to FIG. 2, the plurality of external devices 240 may be shown as devices registered to the local network.

According to various embodiments, the plurality of external devices 240 may be located in various spaces (e.g., a living room, a kitchen, a first room, a second room, or a bathroom) within the house, and communicatively coupled to the electronic device 300 or the server 210 through the hub 230. According to an embodiment, the plurality of external devices 240 may include various types of electronic devices or digital devices operating based on Internet of things (IoT) technology such as a smart home. For example, the plurality of external devices 240 may be referred to as IoT devices. In an example, at least some of the plurality of external devices 240 may include a sensor for sensing an ambient environment or a switch. A device that is not capable of performing direct communication among the plurality of external devices 240 may be communicatively coupled to the electronic device 300 through another external device coupled to the electronic device 300. The plurality of external devices 240 are not limited to the above-described types of devices, and may include any device capable of communicating with the electronic device 300 or the hub 230. The electronic device 300 may perform 1:N communication with the plurality of external devices 240.

According to various embodiments, the plurality of external devices 240 may operate according to a user manipulation or automatically operate when a given condition is satisfied. For example, upon occurrence of an event, the plurality of external devices 240 may output data (or a signal) to the hub 230 in response to the occurrence of the event. For example, the data may include device identification information (e.g., a device identifier (ID)), and the device ID unique to a device may be configured in the process of manufacturing the device. Each of the plurality of external devices 240 may include a communication module (e.g., including communication circuitry) and output data to the hub 230 through the communication module. According to an embodiment, at least some of the plurality of external devices 240 may be connected to the Internet in which the server 210 exists through a wireless fidelity (Wi-Fi) connection based on Wi-Fi.

For example, at least some of the plurality of external devices 240 may access the hub 230 by establishing a connection with the electronic device 300 and receiving information about the hub 230 to be directly accessed through the established connection, access the server 210 through the hub 230, and maintain a connection with the server 210.

According to various embodiments, the electronic device 300, which is a device that manages the plurality of external devices 240, may detect the neighboring external devices 240 and establish communication with each of the external devices 240. Accordingly, the electronic device 300 may receive data from the plurality of external devices 240 and display screens for the plurality of external devices 240 according to the received data. In an embodiment, the electronic device 300 may be a user equipment (UE) (e.g., a smartphone).

According to various embodiments, upon execution of an IoT-based application (hereinafter, referred to as an IoT management app) for controlling the plurality of external devices 240 disposed in a plurality of places, for example, divided spaces in an indoor environment, the electronic device 300 may display a user interface (UI) related to the executed application. According to an embodiment, the electronic device 300 may use the IoT management app to manage a first group of external devices (e.g., a first TV, a first Bluetooth speaker, a first light, a first air conditioner, and a first boiler) arranged in a first space (e.g., a living room) of the house, a second group of external devices (e.g. a refrigerator, an oven, and a microwave oven) arranged in a second space (e.g., a kitchen), a third group of external devices (e.g., a second TV, a second light, a second air conditioner, and a second boiler) arranged in a third space (e.g., a first room), a fourth group of external devices (e.g., a third light, a third air conditioner, and a third boiler) arranged in a fourth space (e.g., second room), or a fifth group of external devices (e.g., a second Bluetooth speaker and a fourth light) arranged in a fifth space (e.g., a bathroom).

Referring to FIG. 3, a user of the electronic device 300 may enter the vehicle device 220, while carrying the electronic device 300, and the electronic device 300 may communicate with the vehicle device 220. In a local network environment in which the hub 230 is disposed, the electronic device 300 may communicate with the plurality of external devices 240 through the hub 230 or directly. The electronic device 300 may directly communicate with the server 210.

According to various embodiments, the server 210 may be the server 108 of FIG. 1. The server 210 may receive information related to the vehicle device 220 from the vehicle device 220. The vehicle device 220 may be an electronic device disposed in a vehicle, and include components similar to those included in the electronic device 101, the electronic device 102, or the electronic device 104 of FIG. 1. Alternatively, the vehicle device 220 may refer, for example, to a vehicle itself having components similar to those of an electronic device (e.g., the electronic device 101, the electronic device 102, or the electronic device 104 of FIG. 1). The server 210 may transmit a control signal to the hub 230. The server 210 may transmit a control signal causing operations of the plurality of external devices 240 to the hub 230. For example, the server 210 may transmit a control signal to the hub 230 based on information received from the vehicle device 220. The hub 230 may control the plurality of external devices 240 based on the control signal received from the server 210. In response to the reception of the control signal from the server 210, the hub 230 may transmit a control signal causing operations of the plurality of external devices 240 to the plurality of external devices 240.

Referring to FIG. 2, direct communication may be conducted between the vehicle device 220 and the server 210 and between the server 210 and the hub 230. Referring to FIG. 3, the vehicle device 220 may communicate with the server 210 through the first relay device 310, and the hub 230 may communicate with the server 210 through the second relay device 320.

According to various embodiments, the first relay device 310 and the second relay device 320 may be implemented in the form of servers (e.g., the server 108 of FIG. 1). When it is said that the server 210 transmits and receives a signal (or information) to and from the vehicle device 220, this may mean, for example, that (1) the server 210 directly transmits and receives the signal (or information) to and from the vehicle device 220, or (2) the server 210 transmits and receives the signal (or information) to and from the vehicle device 220 through the first relay device 310. When it is said that the server 210 transmits and receives a signal (or information) to and from the hub 230, this may mean, for example, that (1) the server 210 directly transmits and receives the signal (or information) to and from the hub 230, or (2) the server 210 transmits and receives the signal (or information) to and from the hub 230 through the second relay device 320. For example, the first relay device 310 (e.g., a vehicle server) may obtain information related to the vehicle device 220. In this case, the server 210 may receive the information related to the vehicle device 220 directly from the vehicle device 220 or from the first relay device 310. For example, the second relay device 320 (e.g., a home server) may obtain information related to the plurality of external devices 240 through the hub 230. In this case, the server 210 may receive the information related to the plurality of external devices 240 directly from the hub 230 or from the second relay device 320.

Figure 4:
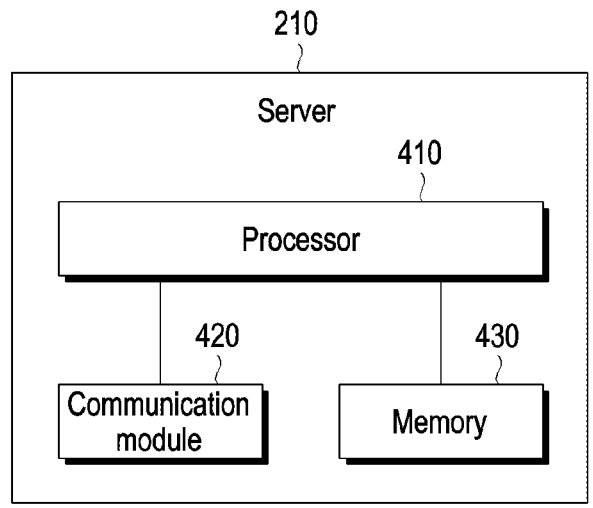
FIG. 4 is a block diagram illustrating an example server according to various embodiments.

FIG. 4 is a block diagram illustrating an example server according to various embodiments.

Referring to FIG. 4, the server 210 may include a processor 410 (e.g., including processing circuitry), a communication module 420 (e.g., including communication circuitry), and memory 430.

According to various embodiments of the disclosure, the processor 410 may communicate with the vehicle device 220, the hub 230, the electronic device 300, the first relay device 310, or the second relay device 320 through the communication module 420. The processor 410 may store information received through the communication module 420 in the memory 430.

Figure 5:
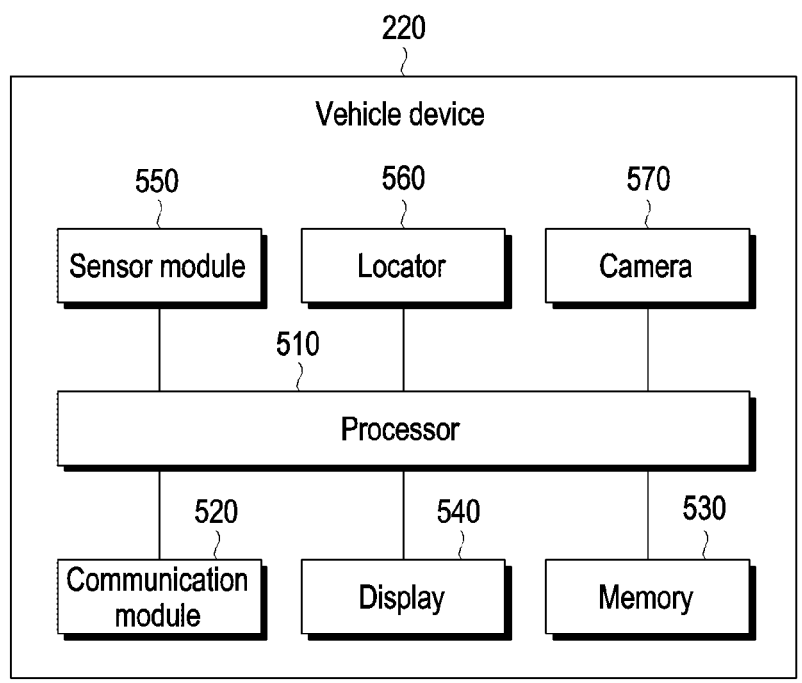
FIG. 5 is a block diagram illustrating an example vehicle device according to various embodiments.

FIG. 5 is a block diagram illustrating an example vehicle device included in an occupant monitoring system, according to various embodiments.

Referring to FIG. 5, the vehicle device 220 may include a processor 510 (e.g., including processing circuitry), a communication module 520 (e.g., including communication circuitry), memory 530, a display 540, a sensor module 550 (e.g., including one or more sensors), a locator 560, and a camera 570.

According to various embodiments, the processor 510 may communicate with the electronic device 300, the server 210, or the first relay device 310 through the communication module 520. The processor 510 may store information received through the communication module 520 in the memory 530.

According to various embodiments, the display 540 may be implemented to be identical to the display module 160 of FIG. 1. The number of displays 540 included in the vehicle device 220 is not limited.

According to various embodiments, the sensor module 550 may be implemented to be identical to the sensor module 176 of FIG. 1. The processor 510 may obtain information related to the vehicle device 220 (or information related to an occupant of the vehicle device 220) through the sensor module 550. For example, the sensor module 550 (e.g., a thermal sensor) may measure the body temperature of an occupant in the vehicle device 220. For another example, the sensor module 550 (e.g., a sensor included in a heating, ventilation, and air conditioning (HVAC) system) may measure the body temperature of the occupant in the vehicle device 220 or a temperature around the occupant.

According to various embodiments, the locator 560 may be a device that measures the location of the vehicle device 220. For example, the locator 560 may be a device including circuitry that supports a global positioning system (GPS). However the type of the locator 560 and the scheme supported by the locator 560 are not limited.

According to various embodiments, the camera 570 may be implemented to be identical to the camera module 180 of FIG. 1. The processor 510 may obtain information related to the vehicle device 220 (or information related to an occupant of the vehicle device 220) through the camera 570. For example, the processor 510 may obtain a video or image of the occupant of the vehicle device 220 through the camera 570.

Figure 6:
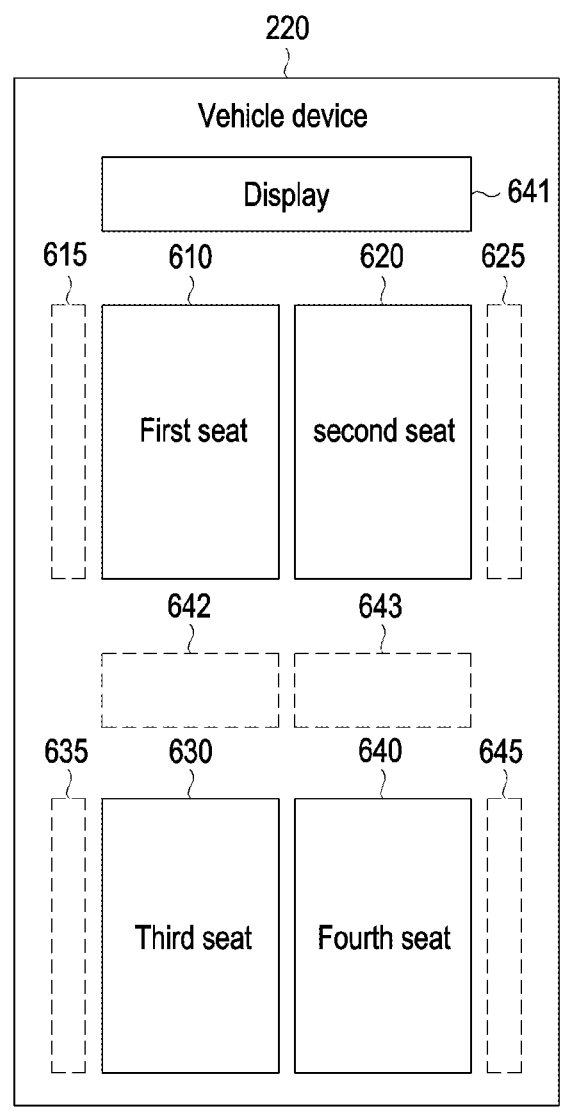
FIG. 6 is a diagram illustrating an example vehicle device according to various embodiments.

FIG. 6 is a diagram illustrating an example vehicle device according to various embodiments.

FIG. 6 is a diagram illustrating a layout of the interior of the vehicle device 220.

Referring to FIG. 6, the vehicle device 220 may include a first seat 610 in which a first occupant is (or may be) located, a second seat 620 in which a second occupant is (or may be) located, a third seat 630 in which a third occupant is (or may be) located, and a fourth seat 640 in which a fourth occupant is (or may be) located. The number and layout of seats included in the vehicle device 220 are not limited. A display 641 may be disposed in front of the first seat 610 and the second seat 620. A display 642 may be disposed in front of the third seat 630. A display 643 may be disposed in front of the fourth seat 640. The vehicle device 220 may further include a display 615, a display 625, a display 635, and a display 645. The display 615, the display 625, the display 635, and the display 645 may be disposed at positions (e.g., windows) adjacent to the first seat 610, the second seat 620, the third seat 630, and the fourth seat 640, respectively. The display 540 of FIG. 5 may include the display 641, the display 642, the display 643, the display 615, the display 625, the display 635, and/or the display 645 of FIG. 6. For example, the vehicle device 220 (e.g., the processor 510 of the vehicle device 220) may display a confirmation message on at least one of the display 641, the display 642, the display 643, the display 615, the display 625, the display 635, and/or the display 645 of FIG. 6, based on reception of a request signal causing the display of the confirmation message. For example, the vehicle device 220 may display one confirmation message related to all occupants on at least one of the display 641, the display 642, the display 643, the display 615, the display 625, the display 635, and/or the display 645 of FIG. 6. For example, the vehicle device 220 may display a confirmation message for each occupant on a display corresponding to the location of the occupant. For example, the vehicle device 220 may display a first confirmation message corresponding to the first occupant on the display 641 or the display 615 adjacent to the first seat 610 in which the first occupant is located. For example, the vehicle device 220 may display a third confirmation message corresponding to the third occupant on the display 642 or the display 635 adjacent to the third seat 630 in which the third occupant is located, or the display 641 as a main display. The confirmation message is a message asking whether to control an external device, and a detailed description of the confirmation message will be provided below.

According to various embodiments, the vehicle device 220 (e.g., the processor 510 of the vehicle device 220) may measure, through the sensor module 550, the temperature of each of the first seat 610, the second seat 620, the third seat 630, and the fourth seat 640 (or the body temperature of the first occupant in the first seat 610, the body temperature of the second occupant in the second seat 620, the body temperature of the third occupant in the third seat 630, and the body temperature of the fourth occupant in the fourth seat 640) (or a temperature around the first occupant, a temperature around the second occupant, a temperature around the third occupant, and a temperature around the fourth occupant). A position at which a temperature sensor (e.g., a temperature sensor included in the sensor module 550) measuring the temperature of each seat (or the body temperature of the occupant in each seat) (or the temperature around the occupant in each seat) is not limited. For example, the vehicle device 220 may include a temperature sensor corresponding to the first seat 610 (e.g., a first temperature sensor included in the sensor module 550), a temperature sensor corresponding to the second seat 620, (e.g., a second temperature sensor included in the sensor module 550), a temperature sensor corresponding to the third seat 630 (e.g., a third temperature sensor included in the sensor module 550), and a temperature sensor corresponding to the fourth seat 640 (e.g., a fourth temperature sensor included in the sensor module 550).

According to various embodiments, the vehicle device 220 (e.g., the processor 510 of the vehicle device 220) may, through the camera 570, obtain a video or image of each of the first occupant in the first seat 610, the second occupant in the second seat 620, the third occupant in the third seat 630, and the fourth occupant in the fourth seat 640. The number and arrangement positions of cameras 570 capable of obtaining a video or image of each occupant is not limited.

Figure 7:
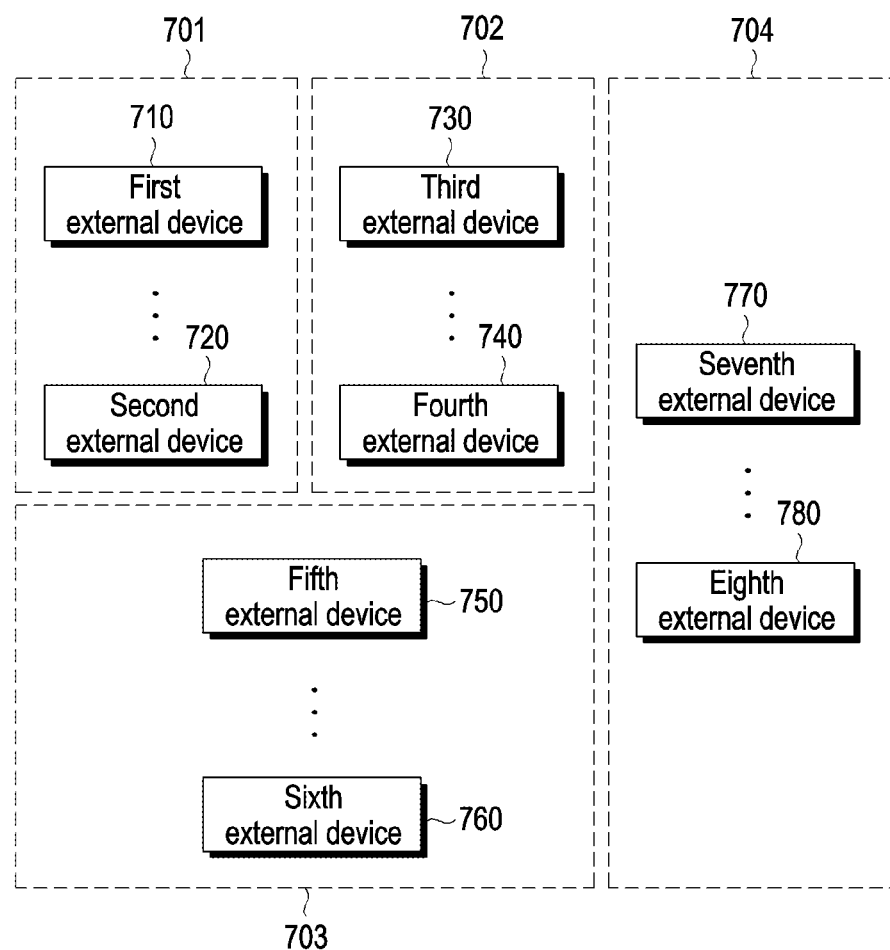
FIG. 7 is a diagram illustrating example external devices included in a local network according to various embodiments.

FIG. 7 is a diagram illustrating example external devices included in a local network according to various embodiments.

FIG. 7 is a diagram illustrating a plurality of external devices 710, 720, 730, 740, 750, 760, 770, and 780 (e.g., the plurality of external devices 240 of FIG. 2) arranged in spaces (e.g., a living room, a kitchen, a first room, or a second room) of a house where a local network is formed. The types of external devices (e.g., the plurality of external devices 240 of FIG. 2) are not limited. For example, an external device may be an air conditioner, a boiler, a heater, a robot cleaner, a light, an air purifier, an oven, a dishwasher, an air dresser, a bathtub, a hair dryer, a rice cooker, a TV, an audio device, a speaker, or a radio.

For example, the first external device 710 (e.g., a first air conditioner) and the second external device 720 (e.g., a first light) may be arranged in a first space 701 (e.g., a first room) in the house. The third external device 730 (e.g., a second air conditioner) and the fourth external device 740 (e.g., a second light) may be arranged in a second space 702 (e.g., a second room) in the house. The fifth external device 750 (e.g., a third air conditioner) and the sixth external device 760 (e.g., a third light) may be arranged in the third space 703 (e.g., a living room) in the house. The seventh external device 770 (e.g., a fourth air conditioner) and the eighth external device 780 (e.g., an oven) may be arranged in a fourth space 704 (e.g., a kitchen) in the house. The plurality of external devices 710, 720, 730, 740, 750, 760, 770, and 780 (e.g., the plurality of external devices 240 of FIG. 2) may be devices registered to the local network in the home. For example, the hub 230 may be disposed in the house, and the plurality of external devices 710, 720, 730, 740, 750, 760, 770, and 780 (e.g., the plurality of external devices 240 of FIG. 2) may communicate with the hub 230. The hub 230 may include sub-hubs disposed in the respective spaces of the house, or may be implemented as a single hub device. When the hub 230 includes the sub-hubs, an external device disposed in each space may communicate with the hub 230 through a sub-hub disposed in the space.

According to various embodiments, a plurality of spaces (e.g., 701, 702, 703, and 704) in the house may be spaces registered to the local network in the house. For example, the server 210 may store information about the plurality of spaces (e.g., 701, 702, 703, and 704) and the plurality of external devices 710, 720, 730, 740, 750, 760, 770, and 780 (e.g., the plurality of external devices 240 of FIG. 2) related to the local network in the house. For example, the server 210 may store information indicating a user to which each of the plurality of spaces 701, 702, 703, and 704 is allocated, and a user to which each of the plurality of external devices 710, 720, 730, 740, 750, 760, 770, and 780 (e.g., each of the plurality of external devices 240 of FIG. 2) is allocated.

Figure 8:
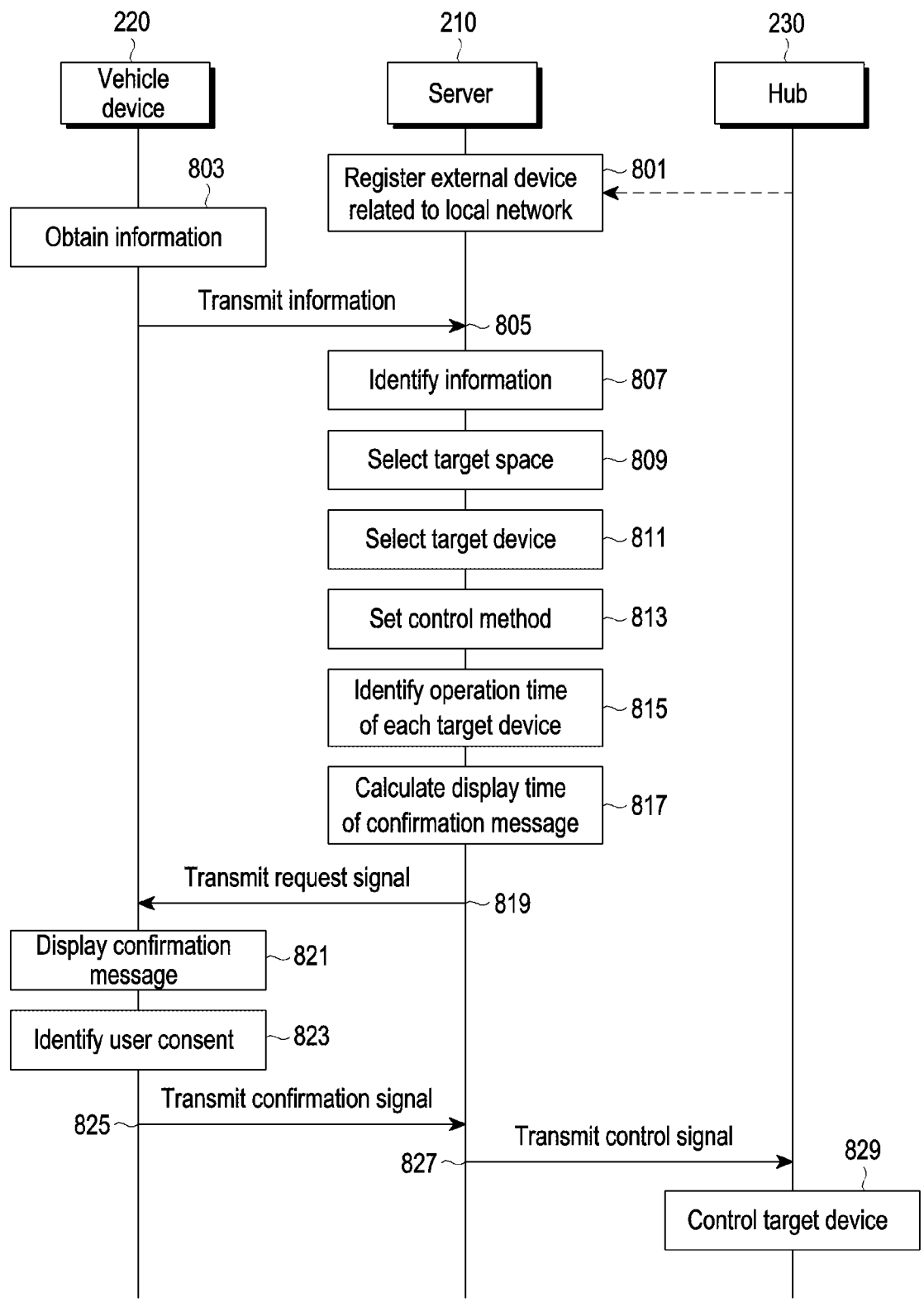
FIG. 8 is a flowchart illustrating an example operation of controlling an external device according to various embodiments.

FIG. 8 is a flowchart illustrating an example operation of controlling an external device according to various embodiments.

Referring to FIG. 8, in operation 801, the server 210 (e.g., the server 108) (e.g., the processor 410 of the server 210) according to various embodiments may register the plurality of external devices 240 related to the local network in the house. A method of registering the plurality of external devices 240 related to the local network by the server 210 is not limited. For example, the server 210 may register the plurality of external devices 240 related to the local network in the house based on information received from the electronic device 300 or information received from the hub 230.

In operation 803, the vehicle device 220 (e.g., the processor 510 of the vehicle device 220) according to various embodiments may obtain information related to the vehicle device 220. For example, the vehicle device 220 may obtain the information related to the vehicle device 220 through the sensor module 550 or the camera 570 of the vehicle device 220. For example, the vehicle device 220 may obtain the information related to the vehicle device 220 through the first relay device 310 (e.g., a vehicle server). The information related to the vehicle device 220 may include, but is not limited to, movement information about the vehicle device 220 and occupant information about the vehicle device 220. For example, the occupant information about the vehicle device 220 may include first occupant information (e.g., information related to the first occupant in the first seat 610), second occupant information (e.g., information related to the second occupant in the second seat 620).), third occupant information (e.g., information related to the third occupant in the third seat 630), and fourth occupant information (e.g., information related to the fourth occupant in the fourth seat 640). For example, the movement information about the vehicle device 220 may include information about a departure place, a destination, and an arrival time of the vehicle device 220. For example, the occupant information about the vehicle device 220 may include a video or image of an occupant. For example, the occupant information about the vehicle device 220 may include information about a fatigue level of the occupant. For example, the occupant information about the vehicle device 220 may include information about the body temperature of the occupant, the temperature of the seat in which the occupant is located, or a temperature around the occupant.

In operation 805, according to various embodiments, the vehicle device 220 may transmit the information related to the vehicle device 220 to the server 210. For example, the vehicle device 220 may transmit the information directly to the server 210 or through the first relay device 310 (e.g., the vehicle server).

In operation 807, according to various embodiments, the server 210 may identify the information related to the vehicle device 220 received from the vehicle device 220. For example, the information related to the vehicle device 220 may refer to the information about the departure place, destination, and arrival time of the vehicle device 220, the fatigue level of the occupant of the vehicle device 220, and the body temperature of the occupant (or the temperature of the seat in which the occupant is located) (or the temperature around the occupant). For example, the server 210 may identify the departure place, the destination, and the arrival time of the vehicle device 220, and the fatigue level and the body temperature of the occupant (or the temperature of the seat in which the occupant is located) (or the temperature around the occupant) in the vehicle device 220 based on the information related to the vehicle device 220, received from the vehicle device 220. Alternatively, in another example, the information related to the vehicle device 220 may refer to basic information from which the information about the departure place, destination, and arrival time of the vehicle device 220, and the fatigue level and the body temperature of the occupant (or the temperature of the seat in which the occupant is located) (or the temperature around the occupant) may be derived. For example, the server 210 may derive the information about the departure place, the destination, and the arrival time of the vehicle device 220, and the fatigue level and the body temperature of the occupant (or the temperature of the seat in which the occupant is located) (or the temperature around the occupant) in the vehicle device 220, based on the information related to the vehicle device 220, received from the vehicle device 220.

In operation 809, according to various embodiments, the server 210 may select, as a target space, at least one of the plurality of spaces (e.g., 701, 702, 703, and 704 of FIG. 7) registered to the local network. The target space may refer, for example, to a space to be controlled among the plurality of spaces (e.g., 701, 702, 703, and 704 of FIG. 7). When it is said that a space is to be controlled, this may, for example, mean that at least one of a plurality of external devices included in the space is to be controlled. For example, the server 210 may select, as a target space, at least one of the plurality of spaces (e.g., 701, 702, 703, and 704 of FIG. 7) registered to the local network, based on the information about the departure place, the destination, and the arrival time of the vehicle device 220, the fatigue level of the occupant, and/or the body temperature of the occupant (or the temperature of the seat where the occupant is located) (or the temperature around the occupant) in the vehicle device 220. A method of selecting a target space by the server 210 will be described with reference to FIG. 9.

In operation 811, according to various embodiments, the server 210 may select, as a target device, at least one of the plurality of external devices (e.g., 710, 720, 730, 740, 750, 760, 770, 780 of FIG. 7) (e.g., at least one of the plurality of external devices 240 of FIG. 2) registered to the local network. The target device may refer, for example, to a device to be controlled among the plurality of external devices. For example, the server 210 may select, as a target device, at least one of a plurality of external devices arranged in the at least one space selected as the target space. For example, the server 210 may select a first space and a third space as target spaces from among the first space, second space, and the third space, and select, as target devices, a first external device from between the first external device and a second external device disposed in the first space, and a third external device and a fourth external device disposed in the third space. The number of selected target spaces and the number of selected target devices are not limited. For example, the server 210 may select, as a target device, at least one of the plurality of external devices (e.g., 710, 720, 730, 740, 750, 760, 770, and 780 of FIG. 7) (e.g., at least one of the plurality of external devices 240 of FIG. 2), based on the information about the departure place of the vehicle device 220, the destination of the vehicle device 220, the arrival time of the vehicle device 220, the fatigue level of the occupant, and/or the body temperature of the occupant (or the temperature of the seat in which the occupant is located) (or the temperature around the occupant) in the vehicle device 220. A method of selecting a target device by the server 210 will be described with reference to FIG. 9.

In operation 813, according to various embodiments, the server 210 may set a control method for the at least one external device (e.g., the at least one of 710, 720, 730, 740, 750, 760, 770, or 780 of FIG. 7) selected as the target device. For example, the control method may include turn-on, turn-off, start, shut-down, operation in power saving mode, an operation level (e.g. temperature, volume, or brightness), an operation duration, a start time, and a shut-down time. For example, the server 210 may set the control method for the at least one external device (e.g., the at least one of 710, 720, 730, 740, 750, 760, 770, or 780 of FIG. 7) selected as the target device, based on the information about the departure place of the vehicle device 220, the destination of the vehicle device 220, the arrival time of the vehicle device 220, the fatigue level of the occupant, and/or the body temperature of the occupant (or the temperature of the seat in which the occupant is located) (or the temperature around the occupant) in the vehicle device 220. A method of setting a control method for a target device by the server 210 will be described with reference to FIG. 9.

In operation 815, according to various embodiments, the server 210 may identify an operation time of each of the at least one external device (e.g., the at least one of 710, 720, 730, 740, 750, 760, 770, or 780 of FIG. 7) selected as the target device. The operation time may refer, for example, to a time required for the external device to operate according to the set control method. For example, in a case in which the server 210 selects an oven as a target device, and sets 200 degrees as a setting temperature, when it takes 5 minutes for the oven to reach 200 degrees, the server 210 may set 5 minutes as the operation time of the oven selected as the target device. For example, in a case in which the server 210 selects an air conditioner as a target device and sets 21 degrees as a setting temperature, when it takes 20 minutes to make the temperature of a space in which the air conditioner is located 21 degrees, the server 210 may determine that the operation time of the air conditioner selected as the target device is 20 minutes. For example, in a case in which the server 210 selects a light as a target device and sets the light to a red brightness of 200 lux, when it takes 0.5 seconds for the light selected as the target device to operate with the red brightness of 200 lux, the server 210 may determine that the operation time of the light selected as the target device is 0.5 seconds. For example, the server 210 may identify the operation time of each of the first external device 710 (e.g., the first air conditioner), the seventh external device 770 (e.g., the fourth air conditioner), and the eighth external device 780 (e.g., the oven), based on selection of the first external device 710 (e.g., the first air conditioner), the seventh external device 770 (e.g., the fourth air conditioner), and the eighth external device 780 (e.g., the oven) as target devices.

In operation 817, according to various embodiments, the server 210 may calculate a display time of a confirmation message. The confirmation message may be a message asking whether to control a target device. For example, the confirmation message may be a message displayed on the display 540 of the vehicle device 220 or the display (e.g., the display module 160) of the electronic device 300. For example, the confirmation message may include information (e.g., the name and control method of the external device selected as a target device) for controlling the external device (e.g., the at least one of 710, 720, 730, 740, 750, 760, 770, or 780 of FIG. 7) selected as the target device. The display time of the confirmation message is a time (e.g., 20 minutes later or 3:30 pm) at which the confirmation message is displayed on the display 540 of the vehicle device 220 or the display (e.g., the display module 160) of the electronic device 300. For example, the server 210 may calculate the display time of the confirmation message based on the operation time of the at least one external device (e.g., the at least one of 710, 720, 730, 740, 750, 760, 770, or 780 of FIG. 7) selected as the target device. For example, based on selection of the first external device 710 (e.g., the first air conditioner), the seventh external device 770 (e.g., the fourth air conditioner), and the eighth external device 780 (e.g., the oven) as target devices, identification of the operation times of the first external device 710 (e.g., the first air conditioner), the seventh external device 770 (e.g., the fourth air conditioner), and the eighth external device 780 (e.g., the oven) as 20 minutes, 10 minutes, and 5 minutes, respectively, and an arrival time being 30 minutes later, the server 210 may calculate the display time to be 10 minutes by subtracting the longest of the identified operation times, 20 minutes, from the arrival time, 30 minutes. The method of calculating a display time is by way of example only. For example, the display time may be calculated to be a time earlier than a time calculated by subtracting an operation time from an arrival time by a specified time, in consideration of the transmission times of various signals and a time taken for a user selection.

In operation 819, according to various embodiments, the server 210 may transmit a request signal causing display of the confirmation message to the vehicle device 220 or the electronic device 300 of an occupant in the vehicle device 220. For example, the server 210 may transmit the request signal causing the display of the confirmation message, at the display time of the confirmation message. In another example, the server 210 may include information about the display time of the confirmation message in the request signal causing the display of the confirmation message, and transmit the request signal.

In operation 821, according to various embodiments, the vehicle device 220 may display the confirmation message (e.g., a message including information about the name and control method of the at least one of the external devices (e.g., the at least one of 710, 720, 730, 740, 750, 760, 770, or 780 of FIG. 7) selected as the target device) on the display 540 based on the request signal received from the server 210. For example, the vehicle device 220 may display the confirmation message in response to the reception of the request signal from the server 210 at the display time of the confirmation message. In another example, the vehicle device 220 may receive the request signal from the server 210 before the display time of the confirmation message, identify the display time included in the request signal, and display the confirmation message at the display time. According to various embodiments, when the electronic device 300 receives the request signal causing the display of the confirmation message, the electronic device 300 (e.g., the processor 120 of the electronic device 300) may display the confirmation message on the display (e.g., the display module 160) of the electronic device 300, and the display time may be understood similarly to the case of the vehicle device 220.

In operation 823, according to various embodiments, the vehicle device 220 may display the confirmation message and identify the user's consent. For example, the vehicle device 220 may display the confirmation message to ask whether to control the external device (e.g., the at least one of 710, 720, 730, 740, 750, 760, 770, or 780 of FIG. 7) selected as the target device, and identify the user's consent based on a user input (e.g., a touch input for an agree button). According to various embodiments, when the electronic device 300 receives the request signal causing the display of the confirmation message, the electronic device 300 may display the confirmation message and identify the user's consent, and a method of identifying a user's consent may be understood similarly to the case of the vehicle device 220.

In operation 825, according to various embodiments, the vehicle device 220 may transmit a confirmation signal to the server 210. The confirmation signal may be a signal causing transmission of a control signal from the server 210 to the hub 230. For example, the vehicle device 220 may transmit the confirmation signal to the server 210 based on the identification of the user's consent.

In operation 827, according to various embodiments, the server 210 may transmit a control signal to the hub 230 based on the reception of the confirmation signal from the vehicle device 220. For example, the control signal may be a signal causing the external device (e.g., the at least one of 710, 720, 730, 740, 750, 760, 770, or 780 of FIG. 7) selected as a target device to operate in the set control method. For example, the control signal may include the information about the external device (e.g., the at least one of 710, 720, 730, 740, 750, 760, 770, or 780 of FIG. 7) selected as a target device, and the information about the set control method.

According to various embodiments, the server 210 may perform operation 827, while skipping operations 819 and 825. When operations 819 and 825 are skipped, the display time may be understood as a control time. The control time may be a time at which the external device selected as a target device is controlled according to a control method. For example, the server 210 may transmit the control signal to the hub 230 at the display time (e.g., the control time) calculated in operation 817, or may transmit a control signal including information about the display time (e.g., the control time) calculated in operation 817 to the hub 230 before the display time (e.g., the control time).

In operation 829, according to various embodiments, the hub 230 may control the external device (e.g., the at least one of 710, 720, 730, 740, 750, 760, 770, or 780 of FIG. 7) selected as a target device, based on the reception of the control signal from the server 230. For example, the hub 230 may transmit a control signal to the external device (e.g., the at least one of 710, 720, 730, 740, 750, 760, 770, or 780 of FIG. 7) selected as a target device.

Figure 9:
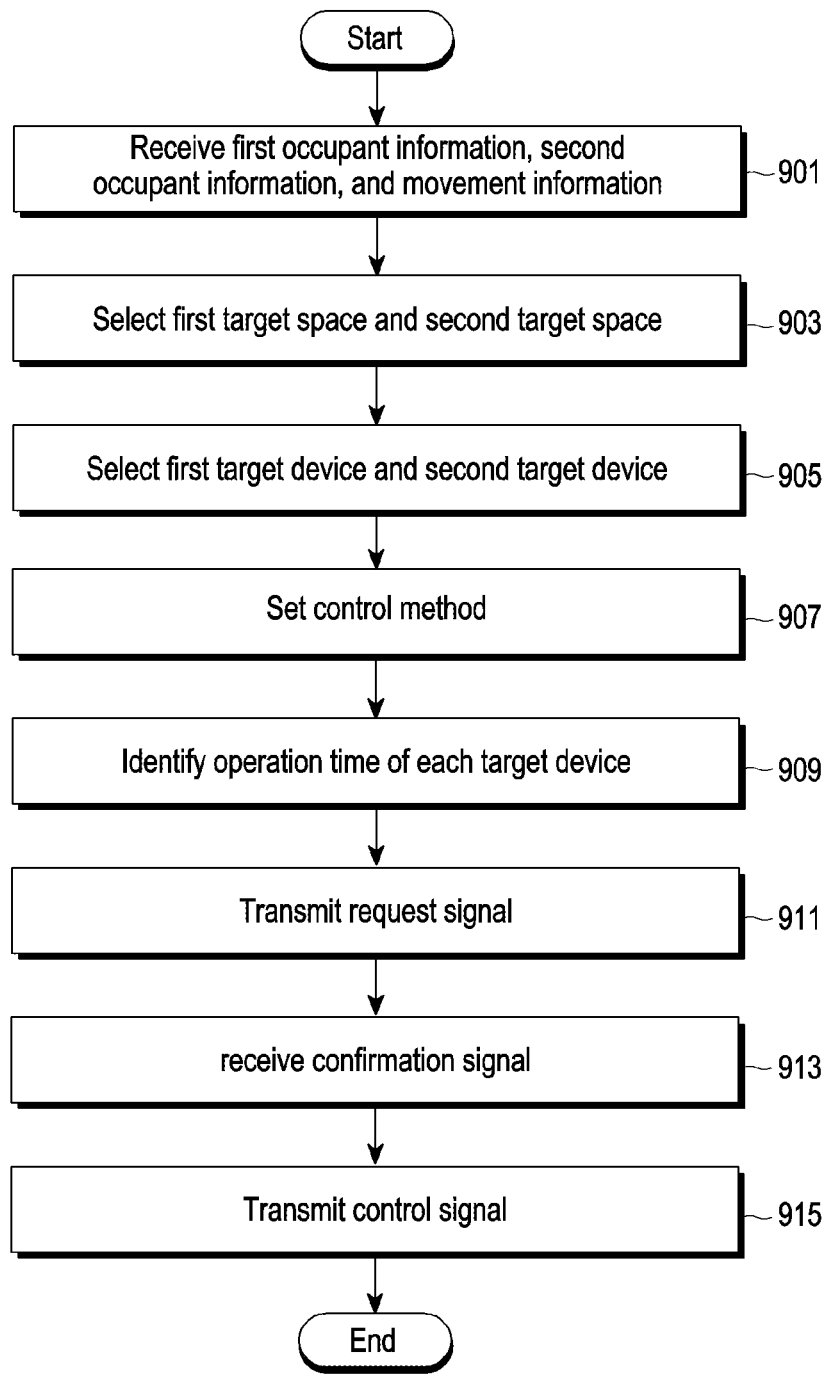
FIG. 9 is a flowchart illustrating an example operation of controlling an external device according to various embodiments.

FIG. 9 is a flowchart illustrating an example operation of controlling an external device according to various embodiments.

Referring to FIG. 9, in operation 901, the server 210 (e.g., the server 108) (e.g., the processor 410 of the server 210) according to various embodiments may receive information related to the vehicle device 220. The information related to the vehicle device 220 has been described with reference to FIG. 8. For example, the server 210 may receive the information related to the vehicle device 220 (e.g., movement information about the vehicle device 220, and first occupant information and second occupant information about the vehicle device 220) from the vehicle device 220 or the first relay device 310. For example, the server 210 may identify a departure place, a destination, and an arrival time of the vehicle device 220, a first fatigue level of a first occupant, a second fatigue level of a second occupant, a first body temperature of the first occupant (or a temperature of the first seat 610 in which the first occupant is located) (or a temperature around the first occupant), and a second body temperature of the second occupant (or a temperature of the second seat 620 in which the second occupant is located) (or a temperature around the second occupant) in the vehicle device 220, based on the information related to the vehicle device 220.

In operation 903, according to various embodiments, the server 210 may select a first target space (e.g., the first space 701 and the fourth space 704) related to the first occupant, and a second target space (e.g., the second space 702) related to the second occupant among the plurality of spaces (e.g., 701, 702, 703, and 704 of FIG. 8) registered to the local network. According to an embodiment, the server 210 may set a "way home mode" related to the first occupant based on the movement information about the vehicle device 220 and the first occupant information about the vehicle device 220. The server 210 may set the "way home mode" related to the second occupant based on the movement information about the vehicle device 220 and the second occupant information about the vehicle device 220. The "way home mode" may include a "cooking mode", a "working mode", a "tired mode", and a "sleeping mode", and the types of the "way home mode" are not limited. For example, as the "way home mode" is set, the server 210 may select at least one space (e.g., at least one of 701, 702, 703, or 704 of FIG. 8) preset in correspondence with the "way home mode" as a target space.

For example, the server 210 may set the "way home mode" of the first occupant to the "cooking mode" based on information about a departure place (e.g., a food store) of the vehicle device 220. For example, based on the setting of the "way home mode" of the first occupant to the "cooking mode", the server 210 may select, as target spaces, spaces (e.g., the third space 703 of FIG. 7 (e.g., the living room), and the fourth space 704 (e.g., the kitchen)) preset in correspondence with the "cooking mode" of the first occupant. The third space 703 (e.g., the living room) and the fourth space 704 (e.g., the kitchen) may be selected as first target spaces related to the first occupant. For example, the server 210 may not set the "way home mode" of the second occupant to the "cooking mode," unlike the first occupant, even when the departure place of the vehicle device 220 is a food store. For example, the server 210 may set the "way home mode" of the first occupant to the "cooking mode", based on the departure place (e.g., the food store), the arrival time (e.g., 23:00), and the first fatigue level (e.g., "tired" to be described later) of the first occupant. The server 210 may set the "way home mode" of the second occupant to the "sleeping mode", based on the departure place (e.g., the food store), the arrival time (e.g., 23:00), and the second fatigue level (e.g., "tired" to be described later) of the second occupant.

For example, the server 210 may set the "way home mode" of the second occupant to the "tired mode" or the "sleeping mode" based on the second fatigue level (e.g., the fatigue level of the second occupant) identified based on the second occupant information about the vehicle device 220 and the arrival time of the vehicle device 220. For example, as the "way home mode" mode of the second occupant is set to the "tired mode", the server 210 may select, as second target spaces related to the second occupant, preset spaces (e.g., the second space 702 (e.g., the second room), and the third space 703 (e.g., the living room) of FIG. 7) corresponding to the "tired mode" of the second occupant. For example, as the "way home mode" of the second occupant is set to the "sleeping mode", the server 210 may select, as a second target spaces related to the second occupant, a preset space (e.g., the second space 702 (e.g., the second room) of FIG. 7) corresponding to the "sleeping mode" of the second occupant.

In operation 905, according to various embodiments, the server 210 may select a first target device (e.g., the first external device 710 and the seventh external device 770) related to the first occupant, and a second target device (e.g., the third external device 730) related to the second occupant among the plurality of external devices (e.g., 710, 720, 730, 740, 750, 760, 770, 780 of FIG. 7) registered to the local network. For example, according to "way home mode" being set, the server 210 may select at least one preset external device (e.g., at least one of 710, 720, 730, 740, 750, 760, 770, 780) corresponding to the set "way home mode" as a target device. For example, the server 210 may select a target space corresponding to the set "way home mode", and select at least one external device corresponding to the set "way home mode" among the plurality of external devices arranged in the selected target space.

For example, the server 210 may set the "way home mode" of the first occupant to the "cooking mode" based on information about a departure place (e.g., a food store) of the vehicle device 220. For example, based on the setting of the "way home mode" of the first occupant to the "cooking mode", the server 210 may select, as first target devices, preset external devices (e.g., the fifth external device 750 (e.g., the third air conditioner) arranged in the third space 703 of FIG. 7 (e.g., the living room), the seventh external device 770 (e.g., the fourth air conditioner) and the eighth external device 780 (e.g., the oven) arranged in the fourth space 704 (e.g., the kitchen)) corresponding to the "cooking mode" of the first occupant.

For example, the server 210 may set the "way home mode" of the second occupant to the "tired mode" or the "sleeping mode" based on the second fatigue level (e.g., the fatigue level of the second occupant) identified based on the second occupant information about the vehicle device 220 and the arrival time of the vehicle device 220. For example, as the "way home mode" mode of the second occupant is set to the "tired mode", the server 210 may select, as second target devices related to the second occupant, preset external devices (e.g., the third external device 730 (e.g., the second air conditioner) among the external devices arranged in the second space 702 (e.g., the second room) of FIG. 7, and the fifth external device 750 (e.g., the third air conditioner) among the external devices arranged in the third space 703 (e.g., the living room) corresponding to the "tired mode" of the second occupant. For example, as the "way home mode" of the second occupant is set to the "sleeping mode", the server 210 may select, as a second target device related to the second occupant, a preset external device (e.g., the third external device 730 (e.g., the second air conditioner) among the external devices arranged in the second space 702 (e.g., the second room) of FIG. 7) corresponding to the "sleeping mode" of the second occupant.

In operation 907, according to various embodiments, the server 210 may set a control method for the at least one external device (e.g., the at least one of 710, 720, 730, 740, 750, 760, 770, or 780 of FIG. 7) selected as a target device. For example, the server 210 may set a control method for the first target device corresponding to the first occupant based on the movement information about the vehicle device 220 and the first occupant information about the vehicle device 220. For example, the server 210 may set a control method for the second target device corresponding to the second occupant based on the movement information about the vehicle device 220 and the second occupant information about the vehicle device 220.

For example, based on the "way home mode" of the first occupant being set to the "cooking mode", the server 210 may set a setting temperature of each of the second target devices (e.g., the fifth external device 750 (e.g., the third air conditioner) and the seventh external device 770 (e.g., the fourth air conditioner)) arranged in the first target spaces (e.g., the third space 703 (e.g., the living room) and the fourth space 704 (e.g., the kitchen) of FIG. 7), based on the first temperature (e.g., the body of the first occupant, the temperature of the first seat 610 in which the first occupant is located, or the temperature around the first occupant) identified based on the first occupant information. For example, based on the "way home mode" of the first occupant being set to the "cooking mode" and the first temperature corresponding to the first occupant being 24 degrees, the server 210 may set the setting temperature of the fifth external device 750 (e.g., the third air conditioner) disposed in the third space 703 (e.g., the living room) to 25 degrees, and maintain the setting temperature of the seventh external device 770 (e.g., the fourth air conditioner) disposed in the fourth space 704 (e.g., the kitchen) to be the existing setting temperature, 22 degrees.

For example, based on the "way home mode" of the second occupant being set to the "tired mode", the server 210 may set the setting temperature of each of the second target devices (e.g., the third external device 730 (e.g., the second air conditioner) and the fifth external device 750 (e.g., the third air conditioner)) arranged in the second target spaces (e.g., the second space 702 (e.g., the second room) and the third space 703 (e.g., the living room) of FIG. 7), based on the second temperature (e.g., the body temperature of the second occupant, the temperature of the second seat 610 in which the second occupant is located, or the temperature around the second occupant) identified based on the second occupant information. For example, the server 210 may determine the setting temperature of each of the second target devices (e.g., the second space 702 (e.g., the second room) and the third space 703 (e.g., the living room) of FIG. 7), which has been set in correspondence with the second occupant, based on the second temperature (e.g., the body of the second occupant, the temperature of the second seat 610 in which the second occupant is located, or the temperature around the second occupant) identified based on the second occupant information. For example, based on the "way home mode" of the second occupant being set to the "tired mode" and the second temperature corresponding to the second occupant being 25 degrees, the server 210 may set the setting temperature of the third external device 750 (e.g., the second air conditioner) disposed in the second space 702 (e.g., the second room) to 27 degrees, and set the setting temperature of the fifth external device 750 (e.g., the third air conditioner) disposed in the third space 703 (e.g., the living room) to 25 degrees.

According to various embodiments, the server 210 may determine to operate at least one of the remaining external devices (e.g., at least one of 710, 720, 730, 740, 750, 760, 770, or 780 of FIG. 7) which have not been set as target devices among the plurality of external devices (e.g., 710, 720, 730, 740, 750, 760, 770, and 780 of FIG. 7) according to a default setting. For example, the default setting may include one of turn-off, shut-down, or operation in a power saving mode, and the type of the default setting is not limited. For example, the server 210 may prevent power waste by limiting operations of the remaining external devices which have not been set as target devices.

In operation 909, according to various embodiments, the server 210 may identify the operation time of each of the selected target devices. For example, the server 210 may identify the operation time of each of at least one first target device selected in correspondence with the first occupant and at least one second target device selected in correspondence with the second occupant. A method of identifying the operation time of a target device by the server 210 has been described before with reference to operation 815 of FIG. 8.

According to various embodiments, the server 210 may calculate a display time of a confirmation message based on an arrival time of the vehicle device 220 and information about the at least one operation time identified in operation 909. A method of calculating the display time of a confirmation message by the server 210 has been described with reference to operation 817 of FIG. 8. For example, the server 210 may calculate the display time of the confirmation message based on the operation time of the at least one first target device selected in correspondence with the first occupant, and the operation time of the at least one second target device selected in correspondence with the second occupant. For example, based on the arrival time of the vehicle device 220 being 30 minutes later, the operation time of the at least one first target device selected in correspondence with the first occupant being 20 minutes later, and the operation time of the at least one second target device selected in correspondence with the second occupant being 10 minutes later, the server 2100 may calculate the display time of the confirmation message to be 10 minutes later by subtracting the longest of the identified operation times, 20 minutes from the arrival time, 30 minutes.

In operation 911, according to various embodiments, the server 210 may transmit a request signal causing display of the confirmation message to the vehicle device 220 or an electronic device (e.g., the electronic device 300) of an occupant (e.g., the first occupant and/or the second occupant) traveling in the vehicle device 220. A method of transmitting a request signal by the server 210 has been described before with reference to operation 819 of FIG. 8. For example, the confirmation message may include information (e.g., the name and control method of a selected external device) for controlling the at least one external device (e.g., the at least one of 710, 720, 730, 740, 750, 760, 770, or 780 of FIG. 7) selected as the first target device corresponding to the first occupant and the second target device corresponding to the second occupant. According to an embodiment, the server 210 may transmit a first request signal causing display of a first confirmation message related to the first target device corresponding to the first occupant, and a second request signal causing display of a second confirmation message related to the second target device corresponding to the second occupant, at the same time or different times. In this case, a first display time related to the first confirmation message and a second display time related to the second confirmation message may be calculated, respectively. Further, the first confirmation message and the second confirmation message may be displayed on the same display or different displays.

In operation 913, according to various embodiments, the server 210 may receive a confirmation signal from the vehicle device 220. Reception of the confirmation signal has been described in operation 825 of FIG. 8.

In operation 915, according to various embodiments, the server 210 may transmit a control signal to the hub 230, based on the reception of the confirmation signal from the vehicle device 220. For example, the control signal may be a signal causing the at least one external device (e.g., the at least one of 710, 720, 730, 740, 750, 760, 770, or 780 of FIG. 7) selected as the first target device corresponding to the first occupant and the second target device corresponding to the second occupant to operate according to a set control method. The transmission of the control signal has been described in operation 827 of FIG. 8.

Those skilled in the art will understand that portions of the description of the operation of FIG. 9 corresponding to portions of the operation of FIG. 8 are not repeated and may be understood similarly to the description of the operation of FIG. 8.

Figure 10:
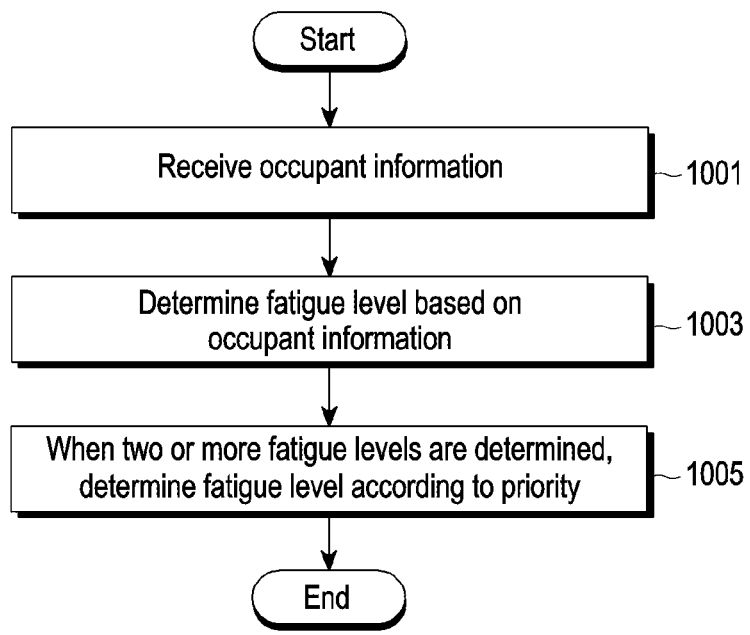
FIG. 10 is a flowchart illustrating an example operation of controlling an external device according to various embodiments.
Figures 11, 12:
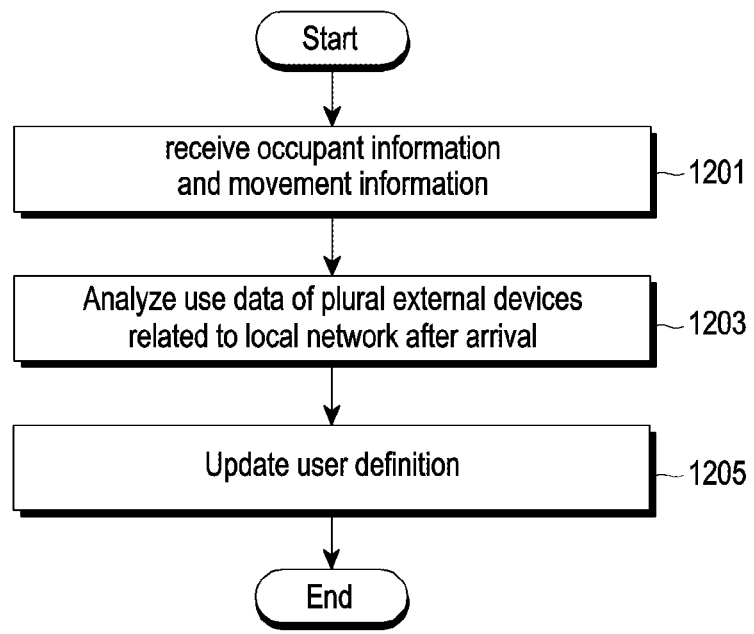
FIG. 11 is a diagram illustrating an example operation of controlling an external device according to various embodiments.
FIG. 12 is a flowchart illustrating an example operation of controlling an external device according to various embodiments.

FIG. 10 is a flowchart illustrating an example operation of controlling an external device according to various embodiments of the disclosure. FIG. 10 will be described with reference to FIG. 11. FIG. 11 is a diagram illustrating an example operation of controlling an external device, according to various embodiments.

Referring to FIG. 10, in operation 1001, the server 210 (e.g., the server 108) (e.g., the processor 410 of the server 210) according to various embodiments may receive occupant information about the vehicle device 220. For example, the occupant information may include videos or images of occupants.

In operation 1003, according to various embodiments, the server 210 may determine the fatigue levels of the occupants based on the occupant information. For example, referring to FIG. 11, the server 210 may determine the fatigue levels of the occupants based on fatigue level determination criteria (e.g., an eye openness level (Eye Openness Levels), the number of blinks per minute (Blinks per Minute), a mouth motion (or yawn) (Mouth Motion-Yawn), and/or a head position (Head Position). The eye openness levee (Eye Openness Levels) may refer, for example, to a degree (or length) to which an occupant's eyelids are open. For example, the server 210 may determine whether the occupant's eye openness level (Eye Openness Levels) is "High" (e.g., fully open), "Medium" (e.g., half-closed), or "Low" (e.g., almost or fully closed). For example, the server 210 may determine whether the number of blinks per minute (Blinks per Minute) of the occupant is within a reference range (e.g., 1 to 29), exceeds the reference range, or is less than the reference range (e.g., in the case of 0 blinks). For example, the server 210 may identify whether the number of mouth motions (or yawns) of the occupant is equal to or greater than a reference number (e.g., 5). For example, the server 210 may identify whether the occupant's head position) is "Low down" (e.g., a bent state).

For example, the server 210 may determine the fatigue level of the occupant based on detection of a specified number of (e.g., two) or more of the fatigue level determination criteria. For example, referring to FIG. 11, the server 210 may determine the fatigue level of the occupant as "Active" (e.g., an active state), based on identification of at least two of a first item indicating that Eye Openness Levels is "High", a second item indicating that Blinks per Minute is included in the reference range (e.g., 1 to 29), a third item indicating that Mouth Motion-Yawn is less than a reference number (e.g., 5), and a fourth item indicating that Head Position is a normal position. For example, the server 210 may determine the fatigue level of the occupant as "Tired" (e.g., a tired state), based on identification of at least two of a first item indicating that Eye Openness Levels is "Medium", a second item indicating that Blinks per Minute exceeds the reference range (e.g., 1 to 29), a third item indicating that Mouth Motion-Yawn is equal to or greater than the reference number (e.g., 5), and a fourth item indicating that Head Position is a normal position. For example, the server 210 may determine the fatigue level of the occupant as "Sleeping" (e.g., a sleeping state), based on identification of at least two of a first item indicating that Eye Openness Levels is "Low", a second item indicating that Blinks per Minute is less than the reference range (e.g., 1 to 29), a third item indicating that Mouth Motion-Yawn is less than the reference number (e.g., 5), and a fourth item indicating that Head Position is "Low down" (e.g., a bent state).

In operation 1005, according to various embodiments, when two or more fatigue levels are determined for the occupant, the server 210 may determine a fatigue level according to preset priorities. For example, when the fatigue levels of "Active" (e.g., the active state) and "Tired" (e.g., the tired state) are determined for the occupant, the server 210 may select "Active" (e.g., the active state) according to preset priorities (e.g., "Active", "Tired", and "Sleeping" in descending order of priorities).

According to various embodiments, the server 210 may set the "way home mode" of the occupant based at least on the fatigue level (e.g., "Active", "Tired", or "Sleeping") determined for the occupant. For example, the server 210 may set the occupant's "way home mode" to the "tired mode" based on the occupant's fatigue level being "Tired". For example, the server 210 may set the "way home mode" of the occupant to the "cooking mode" based on the fatigue level of the occupant being "Tired" and the departure place of the vehicle device 220 being a food store.

While an embodiment in which the server 210 determines the fatigue level of an occupant of the vehicle device 220 has been described with reference to FIG. 10, the vehicle device 220 or the first relay device 310 (e.g., the vehicle server) may determine the fatigue level of the occupant of the vehicle device 220. In this case, the server 210 may receive information about the fatigue level of the occupant of the vehicle device 220 from the vehicle device 220 or the first relay device 310 (e.g., the vehicle server).

FIG. 12 is a flowchart illustrating an example operation of controlling an external device, according to various embodiments.

Referring to FIG. 12, in operation 1201, the server 210 (e.g., the server 108) (e.g., the processor 410 of the server 210) according to various embodiments may receive information related to the vehicle device 220 (e.g., movement information and occupant information about the vehicle device 220). For example, the server 210 may determine and control a target device based on the information related to the vehicle device 220, as described before with reference to FIGS. 8, 9, 10, and 11.

In operation 1203, according to various embodiments, the server 210 may analyze use data after an arrival time of the vehicle device 220. The use data may be actual use data for at least some of a plurality of external devices (e.g., 710, 720, 730, 740, 750, 760, 770, and 780 of FIG. 7) related to the local network. For example, the server 210 may analyze use data for at least one of the plurality of external devices (e.g., 710, 720, 730, 740, 750, 760, 770, and 780 of FIG. 7) based on data received from the hub 230. For example, the use data may include information about a user control history (e.g., whether a setting has been changed or maintained, or the number of control operations) during a specified time (e.g. 30 minutes) from the arrival time of the vehicle device 220 after the at least one external device (e.g., the at least one of 710, 720, 730, 740, 750, 760, 770, or 780 of FIG. 7) is controlled in a set control method. For example, the use data may include information about a user control history (e.g., whether a setting has been changed or maintained or the number of control operations) during a specified time (e.g. 30 minutes) from the arrival time of the vehicle device 220 after at least one external device (e.g., at least one of 710, 720, 730, 740, 750, 760, 770, or 780 of FIG. 7) which has not been selected as a target device is controlled according to a default setting.

In operation 1205, according to various embodiments, the server 210 may update a user definition based on the analyzed use data. User definition may be defined for each passenger. The user definition may refer, for example, to a criterion (or criteria) for selecting a space from among the plurality of spaces (e.g., 701, 702, 703, and 704 in FIG. 8) registered to the local network, and/or selecting an external device from among the plurality of external devices (e.g., 710, 720, 730, 740, 750, 760, 770, and 780 of FIG. 7) registered to the local network, based on movement information and occupant information about the vehicle device 220. For example, the server 210 may update the user definition of each occupant based on actual use data of the plurality of external devices (e.g., 710, 720, 730, 740, 750, 760, 770, and 780 of FIG. 7) after the arrival time of the vehicle device 220. The server 210 may determine a target space and a target device based on the updated user definitions.

Figure 13:
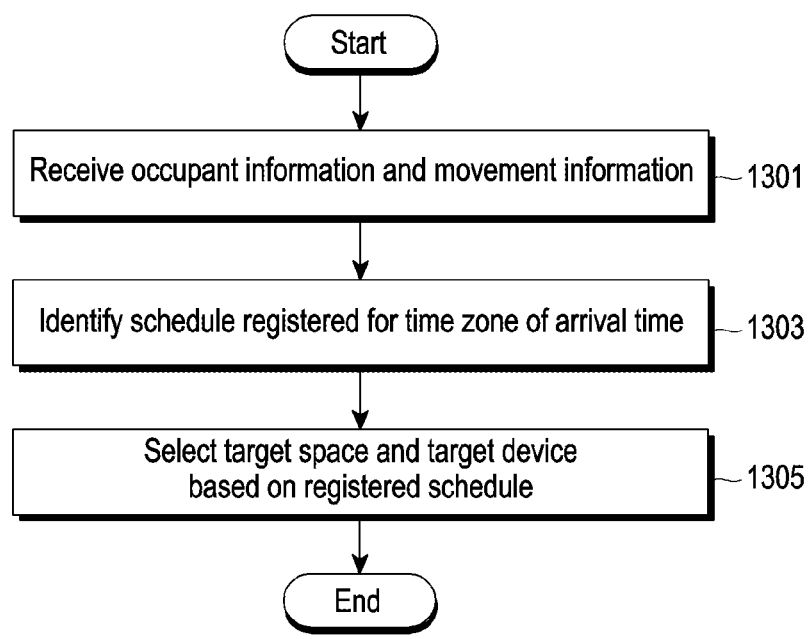
FIG. 13 is a flowchart illustrating an example operation of controlling an external device according to various embodiments.

FIG. 13 is a flowchart illustrating an example operation of controlling an external device according to various embodiments.

Referring to FIG. 13, in operation 1301, the server 210 (e.g., the server 108) (e.g., the processor 410 of the server 210) according to various embodiments may receive information related to the vehicle device 220 (e.g., e.g., movement information and occupant information about the vehicle device 220).

In operation 1303, according to various embodiments, the server 210 may identify a user schedule registered for a time zone of an arrival time of the vehicle device 220. For example, when the arrival time of the vehicle device 220 is 2:30 pm, the server 210 may identify a user schedule for a specified time range from 2:30 pm (e.g., 30 minutes before and after 2:30 pm). A method of identifying a user scheduling by the server 210 is not limited.

In operation 1305, according to various embodiments, the server 210 may select a target space and a target device based at least on the user schedule registered for the time zone of the arrival time of the vehicle device 220. For example, even when the server 210 should determine the "way home mode" of an occupant as the "sleeping mode" according to the embodiment of FIGS. 8, 9, 10, 11, and 12, the server 210 may determine the "way home mode" of the occupant as the "working mode", based on identification of the user schedule registered for the time zone of the arrival time of the vehicle device 220 as "work". An embodiment of selecting a target space and a target device based at least on a registered user schedule by way of example, and should not be construed as limiting.

Those skilled in the art may understand that various embodiments described herein may be organically applied to each other within an applicable range. For example, those skilled in the art may understand that at least some operations of an embodiment described herein may be omitted and that at least some operations of an embodiment and at least some operations of another embodiment may be performed in organic conjunction with each other.

According to various embodiments, the server 210 may include the at least one communication module 420; and the processor 410. The processor may be configured to receive movement information and first occupant information related to the vehicle device 220, using the at least one communication module, select at least one first external device (e.g., at least one of 710, 720, 730, 740, 750, 760, 770, or 780 of FIG. 7) from among a plurality of external devices (e.g., 710, 720, 730, 740, 750, 760, 770, and 780 of FIG. 7) related to a local network, based on the movement information and the first occupant information, calculate a first display time to display a first confirmation message asking whether to control the at least one first external device, based on an arrival time included in the movement information and at least one first operation time of the at least one first external device, and transmit a first request signal causing display of the first confirmation message on the display 540 of the vehicle device at the first display time, using the at least one communication module.

According to various embodiments, the processor may be configured to identify a departure place of the vehicle device based on the movement information, identify a first fatigue level based on the first occupant information, and select the at least one first external device based on the departure place, the arrival time, and/or the first fatigue level.

According to various embodiments, the processor may be configured to select at least one first space from among a plurality of spaces related to the local network, based on the departure place, the arrival time, and/or the first fatigue level, and the at least one first external device may be selected from among at least one external device disposed in the at least one first space.

According to various embodiments, the processor may be configured to receive second occupant information related to the vehicle device, using the at least one communication module, identify a second fatigue level based on the second occupant information, select at least one second external device disposed in at least one second space from among the plurality of external devices related to the local network, based on the departure place, the arrival time, and/or the second fatigue level, identify at least one second operation time of the at least one second external device, and calculate the first display time based on the arrival time, the at least one first operation time, and/or the at least one second operation time.

According to various embodiments, the first confirmation message may include information for controlling the at least one first external device and information for controlling the at least one second external device.

According to various embodiments, the processor may be configured to identify a first temperature based on the first occupant information, and determine a per-space setting temperature for a space in which the at least one first external device is disposed, based on the first temperature.

According to various embodiments, the processor may be configured to receive second occupant information related to the vehicle device, using the at least one communication module, identify a second temperature based on the second occupant information, and determine a per-space setting temperature for at least one second space based on the second temperature.

According to various embodiments, the processor may be configured to analyze use data of the plurality of external devices related to the local network, and update a user definition based on a result of the analysis.

According to various embodiments, the processor may be configured to identify a user schedule registered for the arrival time, and select the at least one first external device based on the user schedule.

According to various embodiments, the processor may be configured to determine that a remaining unselected external device among the plurality of external devices operates according to a default setting.

According to various embodiments, a method of operating the server 210 may include receiving movement information and first occupant information related to the vehicle device 220, using the at least one communication module 420 of the server, selecting at least one first external device (e.g., at least one of 710, 720, 730, 740, 750, 760, 770 or 780 of FIG. 7) from among a plurality of external devices (e.g., 710, 720, 730, 740, 750, 760, 770, and 780 of FIG. 7) related to a local network, based on the movement information and the first occupant information, calculating a first display time to display a first confirmation message asking whether to control the at least one first external device, based on an arrival time included in the movement information and at least one first operation time of the at least one first external device, and transmitting a first request signal causing display of the first confirmation message on a display of the vehicle device at the first display time, using the at least one communication module.

According to various embodiments, selecting the at least one first external device may include identifying a departure place of the vehicle device based on the movement information, identifying a first fatigue level based on the first occupant information, and selecting the at least one first external device based on the departure place, the arrival time, and/or the first fatigue level.

According to various embodiments, selecting the at least one first external device may include selecting at least one first space from among a plurality of spaces related to the local network, based on the departure place, the arrival time, and/or the first fatigue level, and the at least one first external device may be selected from among at least one external device disposed in the at least one first space.

According to various embodiments, the method may further include receiving second occupant information related to the vehicle device, using the at least one communication module, identifying a second fatigue level based on the second occupant information, selecting at least one second external device disposed in at least one second space from among the plurality of external devices related to the local network, based on the departure place, the arrival time, and/or the second fatigue level, and identifying at least one second operation time of the at least one second external device. Calculating the first display time may include calculating the first display time based on the arrival time, the at least one first operation time, and/or the at least one second operation time.

According to various embodiments, the first confirmation message may include information for controlling the at least one first external device and information for controlling the at least one second external device.

According to various embodiments, the method may further include identifying a first temperature based on the first occupant information, and determining a per-space setting temperature for a space in which the at least one first external device is disposed, based on the first temperature.

According to various embodiments, the method may further include receiving second occupant information related to the vehicle device, using the at least one communication module, identifying a second temperature based on the second occupant information, and determining a per-space setting temperature for at least one second space based on the second temperature.

According to various embodiments, the method may further include determining that a remaining unselected external device among the plurality of external devices operates according to a default setting.

According to various embodiments, the electronic device 300 may include the display module 160, the at least one communication module 190, and the processor 120. The processor may be configured to receive, from a server, a first request signal for displaying a first confirmation message for controlling at least one first external device (e.g., at least one of 710, 720, 730, 740, 750, 760, 770, or 780 of FIG. 7) among a plurality of external devices (e.g., 710, 720, 730, 740, 750, 760, 770, and 780 of FIG. 7) related to a local network of a destination of a vehicle device in which a user of the electronic device is located, using the at least one communication module, display the first confirmation message, using the display module, identify a user consent to the first confirmation message based on a user input, and transmit a confirmation signal to the server, using the at least one communication module in response to the identification of the user consent.

According to various embodiments, the processor may be configured to control the display module to display the first confirmation message at a first display time determined based on an arrival time of the vehicle device and at least one first operation time of the at least one first external device in response to the reception of the first request signal.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or combinations thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium may refer, for example, to a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A server comprising:
   communication circuitry; and
   at least one processor; and
   memory storing instructions that, when executed by the at least one processor, individually and/or collectively, cause the server to:
   receive movement information and first occupant information related to a vehicle device, using the communication circuitry,
   select at least one first external device among a plurality of external devices related to a local network, based on the movement information and the first occupant information,
   calculate a first display time to display a first confirmation message asking whether to control the at least one first external device, based on an arrival time included in the movement information and at least one first operation time of the at least one first external device, and
   transmit a first request signal causing display of the first confirmation message on a display of the vehicle device at the first display time, using the communication circuitry.

2. The server of claim 1, wherein the instructions, when executed by the at least one processor, individually and/or collectively, cause the server to:
   identify a departure place of the vehicle device based on the movement information,
   identify a first fatigue level based on the first occupant information, and
   select the at least one first external device based on the departure place, the arrival time, and the first fatigue level.

3. The server of claim 2, wherein the instructions, when executed by the at least one processor, individually and/or collectively, cause the server to select at least one first space among a plurality of spaces related to the local network, based on the departure place, the arrival time, and the first fatigue level, and
   wherein the at least one first external device is selected among at least one external device disposed in the at least one first space.

4. The server of claim 2, wherein the instructions, when executed by the at least one processor, individually and/or collectively, cause the server to:

receive second occupant information related to the vehicle device, using the communication circuitry, identify a second fatigue level based on the second occupant information, select at least one second external device disposed in at least one second space among the plurality of external devices related to the local network, based on the departure place, the arrival time, and the second fatigue level, identify at least one second operation time of the at least one second external device, and calculate the first display time based on the arrival time, the at least one first operation time, and the at least one second operation time.

5. The server of claim 4, wherein the first confirmation message includes information for controlling the at least one first external device and information for controlling the at least one second external device.

6. The server of claim 1, wherein the instructions, when executed by the at least one processor, individually and/or collectively, cause the server to:

identify a first temperature based on the first occupant information, and determine a per-space setting temperature for a first space in which the at least one first external device is disposed, based on the first temperature.

7. The server of claim 6, wherein the instructions, when executed by the at least one processor, individually and/or collectively, cause the server to:

receive second occupant information related to the vehicle device, using the communication circuitry, identify a second temperature based on the second occupant information, and determine a per-space setting temperature for at least one second space based on the second temperature.

8. The server of claim 1, wherein the instructions, when executed by the at least one processor, individually and/or collectively, cause the server to:

analyze use data of the plurality of external devices related to the local network, and update a user definition based on a result of the analysis.

9. The server of claim 1, wherein the instructions, when executed by the at least one processor, individually and/or collectively, cause the server to:

identify a user schedule registered for the arrival time, and select the at least one first external device based on the user schedule.

10. The server of claim 1, wherein the instructions, when executed by the at least one processor, individually and/or collectively, cause the server to determine that a remaining unselected external device among the plurality of external devices operates according to a default setting.

11. A method of operating a server, comprising:

receiving movement information and first occupant information related to a vehicle device, using communication circuitry of the server;

selecting at least one first external device from among a plurality of external devices related to a local network, based on the movement information and the first occupant information;

calculating a first display time to display a first confirmation message asking whether to control the at least one first external device, based on an arrival time included in the movement information and at least one first operation time of the at least one first external device; and transmitting a first request signal causing display of the first confirmation message on a display of the vehicle device at the first display time, using the communication circuitry.

12. The method of claim 11, wherein selecting the at least one first external device comprises:

identifying a departure place of the vehicle device based on the movement information, identifying a first fatigue level based on the first occupant information, and selecting the at least one first external device based on the departure place, the arrival time, and the first fatigue level.

13. The method of claim 12, wherein selecting the at least one first external device comprises selecting at least one first space among a plurality of spaces related to the local network, based on the departure place, the arrival time, and the first fatigue level, and wherein the at least one first external device is selected among at least one external device disposed in the at least one first space.

14. The method of claim 12, further comprising:

receiving second occupant information related to the vehicle device, using the communication circuitry, identifying a second fatigue level based on the second occupant information, selecting at least one second external device disposed in at least one second space among the plurality of external devices related to the local network, based on the departure place, the arrival time, and the second fatigue level, and identifying at least one second operation time of the at least one second external device, and wherein calculating the first display time comprises calculating the first display time based on the arrival time, the at least one first operation time, and the at least one second operation time.

15. The method of claim 14, wherein the first confirmation message includes information for controlling the at least one first external device and information for controlling the at least one second external device.

16. The method of claim 11, further comprising:

identifying a first temperature based on the first occupant information, and determining a per-space setting temperature for a first space in which the at least one first external device is disposed, based on the first temperature.

17. The method of claim 16, further comprising:

receiving second occupant information related to the vehicle device, using the communication circuitry, identifying a second temperature based on the second occupant information, and determining a per-space setting temperature for at least one second space based on the second temperature.

18. The method of claim 11, further comprising determining that a remaining unselected external device among the plurality of external devices operates according to a default setting.

19. An electronic device comprising:

a display;

communication circuitry;

at least one processor; and memory storing instructions that, when executed by the at least one processor, individually and/or collectively, cause the electronic device to:

receive, from a server, a first request signal for displaying, at a display time, a first confirmation message asking whether to control at least one first external device among a plurality of external devices related to a local network of a destination of a vehicle device in which a user of the electronic device is located, using the communication circuitry, the at least one first external device being selected by the server among the plurality of external devices based on movement information and occupant information related to the vehicle device, the display time being calculated by the server based on an arrival time included in the movement information and at least one operation time of the at least one first external device, display the first confirmation message, at the display time, using the display, identify a user consent to the first confirmation message based on a user input, and transmit a confirmation signal to the server, using the communication circuitry in response to the identification of the user consent.

\* \* \* \* \*